(12) United States Patent
Afram

(10) Patent No.: US 10,846,467 B2
(45) Date of Patent: *Nov. 24, 2020

(54) METHOD AND SYSTEM FOR DISPLAYING AND SEARCHING INFORMATION IN AN ELECTRONIC DOCUMENT

(71) Applicant: ipQuants GmbH, Zurich (CH)

(72) Inventor: Tony Afram, Rheinfallstrasse (CH)

(73) Assignee: ipQuants GmbH (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,656

(22) Filed: Sep. 9, 2019

(65) Prior Publication Data

US 2020/0073923 A1   Mar. 5, 2020

Related U.S. Application Data

(63) Continuation of application No. 13/924,245, filed on Jun. 21, 2013, now Pat. No. 10,409,900.

(60) Provisional application No. 61/763,313, filed on Feb. 11, 2013.

(51) Int. Cl.
  *G06F 40/166* (2020.01)
  *G06F 40/106* (2020.01)

(52) U.S. Cl.
  CPC .......... *G06F 40/166* (2020.01); *G06F 40/106* (2020.01)

(58) Field of Classification Search
  None
  See application file for complete search history.

(56) References Cited

U.S. PATENT DOCUMENTS

| | | | | |
|---|---|---|---|---|
| 6,044,387 A * | 3/2000 | Angiulo | ................ | G06F 40/166 |
| | | | | 715/257 |
| 6,718,518 B1 * | 4/2004 | Plow | ...................... | G06F 40/166 |
| | | | | 715/205 |
| 6,748,375 B1 * | 6/2004 | Wong | ................. | H04N 21/4312 |
| 6,877,137 B1 * | 4/2005 | Rivette | ................ | G06F 16/955 |
| | | | | 715/230 |
| 8,775,458 B1 * | 7/2014 | Skare | .................... | G06F 16/951 |
| | | | | 707/766 |
| 9,235,858 B1 * | 1/2016 | Singh | ................. | G06Q 30/0623 |
| 2002/0116420 A1 * | 8/2002 | Allam | .................. | G06F 40/106 |
| | | | | 715/273 |
| 2004/0139400 A1 * | 7/2004 | Allam | .................. | G06F 40/106 |
| | | | | 715/201 |
| 2005/0080770 A1 * | 4/2005 | Lueder | .................. | G06F 3/0481 |
| 2005/0216443 A1 * | 9/2005 | Morton | ................. | G06F 16/447 |
| 2006/0047653 A1 * | 3/2006 | Vaidyanathan | .......... | G06F 8/20 |
| 2009/0216790 A1 * | 8/2009 | Dexter | ................. | G06F 16/951 |
| 2009/0282363 A1 * | 11/2009 | Jhaveri | ................ | G06F 16/951 |
| | | | | 715/790 |

(Continued)

*Primary Examiner* — Asher D Kells
(74) *Attorney, Agent, or Firm* — Dunlap Codding, P.C.

(57) ABSTRACT

The present invention provides an electronic document review method comprising the steps of displaying at least a first document section of said document in a first display window, displaying at least a second document section of said document in a second display window, and arranging said second window so that said second window is arranged within the border of the first window. Such a method allows for efficient review of electronic documents thereby enabling a user to reduce the amount of time the user spends for reviewing an electronic document. The invention also provides an electronic document review system.

12 Claims, 13 Drawing Sheets

(56) References Cited

U.S. PATENT DOCUMENTS

| | | | |
|---|---|---|---|
| 2010/0030765 A1* | 2/2010 | Chi | G06F 16/93 |
| | | | 707/726 |
| 2014/0046923 A1* | 2/2014 | Ruble | G06F 3/04847 |
| | | | 707/706 |
| 2014/0223381 A1* | 8/2014 | Huang | G06F 3/04883 |
| | | | 715/863 |

* cited by examiner

METHOD AND SYSTEM FOR DISPLAYING AND SEARCHING INFORMATION IN AN ELECTRONIC DOCUMENT

INCORPORATION BY REFERENCE OF RELATED APPLICATIONS

The present patent application is a continuation of U.S. Ser. No. 13/924,245, which was filed on Jun. 21, 2013, which hereby incorporates by reference the patent application identified by U.S. Ser. No. 61/763,313, which was filed on Feb. 11, 2013, and titled "Electronic Document Review Method and System."

FIELD OF THE INVENTION

The present invention relates to a method for reviewing an electronic document and a computer system for reviewing an electronic document.

BACKGROUND

User interfaces, such as graphical user interfaces (GUIs), for browsing electronic documents such as web pages and PDF documents are well known. Such known user interfaces enable the user to review an electronic document on a computer system such as a desktop computer device, mobile computer device and the like by scrolling through the document through user input.

The scrolling operation allows the user to review different segments of the document, such as the different pages. The scrolling operation is, for example, conducted by keystroke, mouse input or user touch input. The scrolling operation can also be conducted by touchless input, such as touchless user movements, eye-tracking and/or voice command; in case the computing system has such touchless functionality.

Irrespective of the scrolling operation, the known document review methods do not provide satisfactory document review experience upon reviewing "long documents", e.g. documents with many pages, such as a book. Some long documents, such as a website, might not have several distinct pages. These are nevertheless still considered as long documents in the sense that the user has to scroll through many lines of text and/or media content (images, video etc) to review the entire document. Thus, in common for all "long documents" is the fact that the entire content of the document cannot be shown at once in a readable manner in a document display window. The user must scroll (browse) through the document in order to review the entire content thereof.

The term electronic document encompasses any type of electronic document data format, including but not limited to word processing documents, spreadsheets, presentations, images, maps, emails, websites etc. Typical examples of electronic documents data formats include Adobe PDF® documents, Microsoft WORD, documents, website in HTML or the like.

Known user interfaces provide the well-known feature of scrolling pages by providing "page up" and "page down" functionality, thereby enabling the user to quickly jump to the desired page. However, it is evident that in case of a long document, e.g. a document with two pages or more, this does not provide a user friendly solution for the user who has to switch between different passages of the document to obtain a deeper understanding of the teaching thereof.

The aforementioned limitations in the prior art have been addressed by a search functionality, which allows the user to search for particular terms within a document. Usually the user inputs the search term in a specifically foreseen search field and upon confirming the term, a search is conducted for the inputted search term within the document. The user is then directed to the text passage that includes the search term. Quick browsing between the different passages showing the search term is enabled by providing "next" and "previous" icons, thereby skipping those text passages that do not contain the relevant search term.

Thus, the user can skip several pages at once. This approach is, however, also not satisfactory. The user of this known method is distracted in his document review process due to the requirement of "jumping" to the different sections of the document. Therefore, the user might review the entire document quicker, but it does not necessarily enable the user to understand the teaching of the document in a more efficient manner. The frequent "jumping" between different text passages eventually negatively effects a user's concentration.

To overcome the above-mentioned limitations of the known search method, it has been suggested to display selectable thumbnail images of pages of the document in a side panel. This allows the user to directly jump to a particular page. This method of reviewing a document, however, has the same drawback as mentioned earlier, i.e. the user is distracted by the jumping action between different pages and/or sections of the document. This becomes even more critical on a mobile device which has a limited screen size and thus makes it even more difficult for the user to maintain a good overview of the content of the document.

It is evident that for the review of complex documents, for example legal documents such as design patents, utility models, (utility) patent applications, and/or patent specifications (collectively patent documents or patents) any distraction is detrimental for an efficient review of the document by the user. The same holds true for the review of any other legal document, such as a legal agreement or other complex documents, such as complex scientific publications, financial annual reports and the like.

Moreover, the review of long documents through the known methods usually has the user spend a significant amount of time using a computer system, thereby negatively influencing the energy consumption of the system. It is moreover not unusual that the dissatisfied user of the prior art methods and systems eventually prints out the document in order to review the document in paper form. This not only has a negative effect on the environment due to the increased consumption of paper, but also on the toner consumption of the printer, the wear of the printer etc. Thus, in providing an efficient electronic document review method, also such environmental technology problems could be mitigated.

SUMMARY

It is an object of the present invention to provide an electronic document, preferably patent document, review method and an electronic, preferably patent, document computer review system that overcomes the drawbacks of the known methods and systems and which allows a cost efficient review of electronic documents. Moreover, the invention also sets out to provide a computer non-transitory readable medium.

This is achieved by providing an electronic, preferably patent, document review method for reviewing an electronic document by at least one user, said method comprising the steps of displaying at least a first document section of said document in a first display window and displaying at least a second document section of the document in a second display window, and arranging said second window so that said second window is within the border of the first window. The steps of displaying the first document section and the second document section can be accomplished by passing signals to a monitor. In one embodiment, the steps of displaying includes passing a suitable programming language, such as HTML code to the processor, which then generates and passes video signals to the monitor.

The second window preferably overlaps the first window and stays in front of the first window. The second window preferably covers only a portion of the first window, so that the first document section is visible to the user at all times. The second display window is preferably also re-sizeable in order to adapt its size as needed. The user of this method can thus view different sections of one and the same electronic document without having to change the content of the first display window the user is currently viewing. Hence, any negative effect on the user's concentration level is avoided. The first display window could, for example, be a browser window and the border within which the second window is arranged is thus for example the border of the browser window.

The inventive method enables the user to stay focused on at least a first document section of a document, while simultaneously reviewing at least a second document section of the same document. There is no need for the user to browse away from the first document section displayed in a first display window to learn more about the content currently displayed therein. The second window overlapping the first window allows a close allocation of segments of interest, thus further adding in avoiding any negative effect on the user's concentration level. The second window preferably only covers a portion of the first display window. Thus, the second display window is preferably smaller in size than the first display window, thereby allowing the user to constantly view a section of interest in the first display window. The first display window may also display further document sections of the document in addition to the first document section.

According to a preferred embodiment the method further comprises the steps of providing search functionality within said second window and displaying said at least a second document section in response to said search in said second display window. The search functionality enables a search within the text of the document currently under review. The result of the search is displayed within the second display window, so that the content displayed in the first window during the performance of the search is not altered. All search results of the search are preferably displayed within said second window and can be further analyzed within said second window.

Thus the second document section and any further document section retrieved in response to said search is/are displayed in said second display window. The second document section is preferably comprised of several characters in addition to the search character used for performing the search. Therefore not only the search character itself—which could be a single word—is displayed as the second document section, but preferably additional characters so that the user also understands the content within which the search character is disclosed in the document.

For example, the entire sentence within which the search character is defined can be displayed as the second document section in the second display window. As a further example, it could be determined to include—in the second document section to be displayed—a specified set of characters that are disclosed before and after the found search character in the text of the document. For example, it could be determined to include the 10 characters before and after the found search term. Any further document sections disclosing the search character can preferably be disclosed as further document sections within the second display window in addition to said second document section. Thus, the user preferably searching for a term relating to what is currently displayed in the first display window, can according to this preferred embodiment obtain a complete understanding of the term of interest without browsing away from the first document section displayed in the first display window.

According to a further preferred embodiment the method comprises creating at least one result window within the second display window and displaying said second document section within said result window. If in response to the search query more than one hit is obtained, each such hit is preferably displayed within a separate result window within said second display window. Thus, the second display window may include several result windows each of which disclosing a document section. It is thus possible to provide a quick overview and understanding of the term subject to the search query. Any alterations in the second display window leave the first display window unaffected so that the user can quickly and with high efficiency review and understand the first document section displayed in the first window.

According to a further preferred embodiment, the method comprises increasing the size of the result window and, upon increasing the size, an increased number of characters of the total amount of characters of the second document section are displayed. The result window with increased size can be displayed outside of the second display window in an enlarged result window so that the total amount of characters of the second document section is shown in the enlarged result window and the result window within the second display window displays a first set of characters of the total amount of characters. Also this embodiment has the advantage that the first document section shown in the first display window is maintained and not altered. Thus, despite a user being able to select a result window, no jumping away from the first document section or similar operation as known from the prior art is conducted in order to present to the user more details of the text of interest as displayed within the result window.

According to a further preferred embodiment the method comprises displaying a first set of characters of the total amount of characters of said second document section in said result window in response to said search, wherein upon increasing the size of said result window further characters of said total amount of characters of the second document section are displayed within said result window. Displaying only a portion of the second document section initially saves display screen space.

The user may choose to increase the size of the result window in order to view even more characters of the second document section. The user preferably interacts with the second display window and each of the result windows displayed therein only in order to obtain a full understanding of the document section of interest. Even if the result window only shows a portion of the total characters of the second document section displayed within the result window, the remaining characters can be viewed without browsing away from the first document section and preferably even without increasing the size of the second display window. Preferably only the result window needs to be resized, which may not have an influence on the size of the second display window. If there are several result windows within the second display window, each of the result windows may function as described above.

According to a preferred embodiment the method further comprises the steps of transforming the result window into an annotation in response to respective user input and adding said annotation to the first document section displayed in the first display window. This preferred embodiment allows not only efficient review of the electronic document, but also a time saving approach to annotate the document under review. Preferably the user is provided with a commenting module, which allows the user to insert his personal comments within a result window. Thereby both the second document section as well as user personal comments can be added as an annotation simultaneously to the document.

According to another preferred embodiment the method comprises the step of creating the second window as a floating window, preferably a re-arrangeable floating window. Even if the user scrolls to a different document section within the first display window, the second window will be visible at all time. Enabling the second window to be re-arrangeable within the first display window provides the advantage that the user can align the second window closely to a particular section of interest being displayed in the first document section.

In a further preferred embodiment, the method comprises the steps of retrieving the first document section for display in the first window in a first data format and retrieving the second document section for display in the second window in a second data format different from the first data format. The first data format can, as an example only, be in the original format of the electronic document (e.g. PDF format). This is of particular importance in the legal field, where attorneys rely on official governmental copies only.

As an example, the first format could be the official PDF publication of a patent from a patent office. In order to improve user review experience by shortening the download time of the second document section, the second data format can be in a different format. It is, for example, possible to retrieve the patent content in XML or HTML format and display the second document section in XML or HTML format in order to shorten the download time. This also solves the technical problem of providing short download times and also has a positive impact on user experience.

It is also an object of the present invention to provide an electronic document computer review system for electronic document review that overcomes the drawbacks of the known systems. Moreover, the invention also sets out to provide a computer non-transitory readable medium. These objects are achieved by providing a computer system and computer readable medium as defined in the claims.

The object of providing an electronic document review system is achieved by a system as defined in the respective claims. According to a preferred embodiment of the review system, computer executable logic is provided that is configured to establish re-sizing of the result window and show an increased number of characters of the total amount of characters of the second document section upon increasing its size. The increased result window can for example be arranged within the second display window or the system is configured such that the increased result window is re-sized outside of the second display window in an enlarged result window. Either way, the first document section displayed in the first display window remains unaffected so that any user action in the second display window and/or (enlarged) result window does not have any negative influence on the user's concentration level.

BRIEF DESCRIPTION OF THE DRAWINGS

The present disclosure will be described hereafter with reference to the attached drawings which are given as non-limiting examples only, in which.

DETAILED DESCRIPTION OF THE EMBODIMENTS

Figure 1:
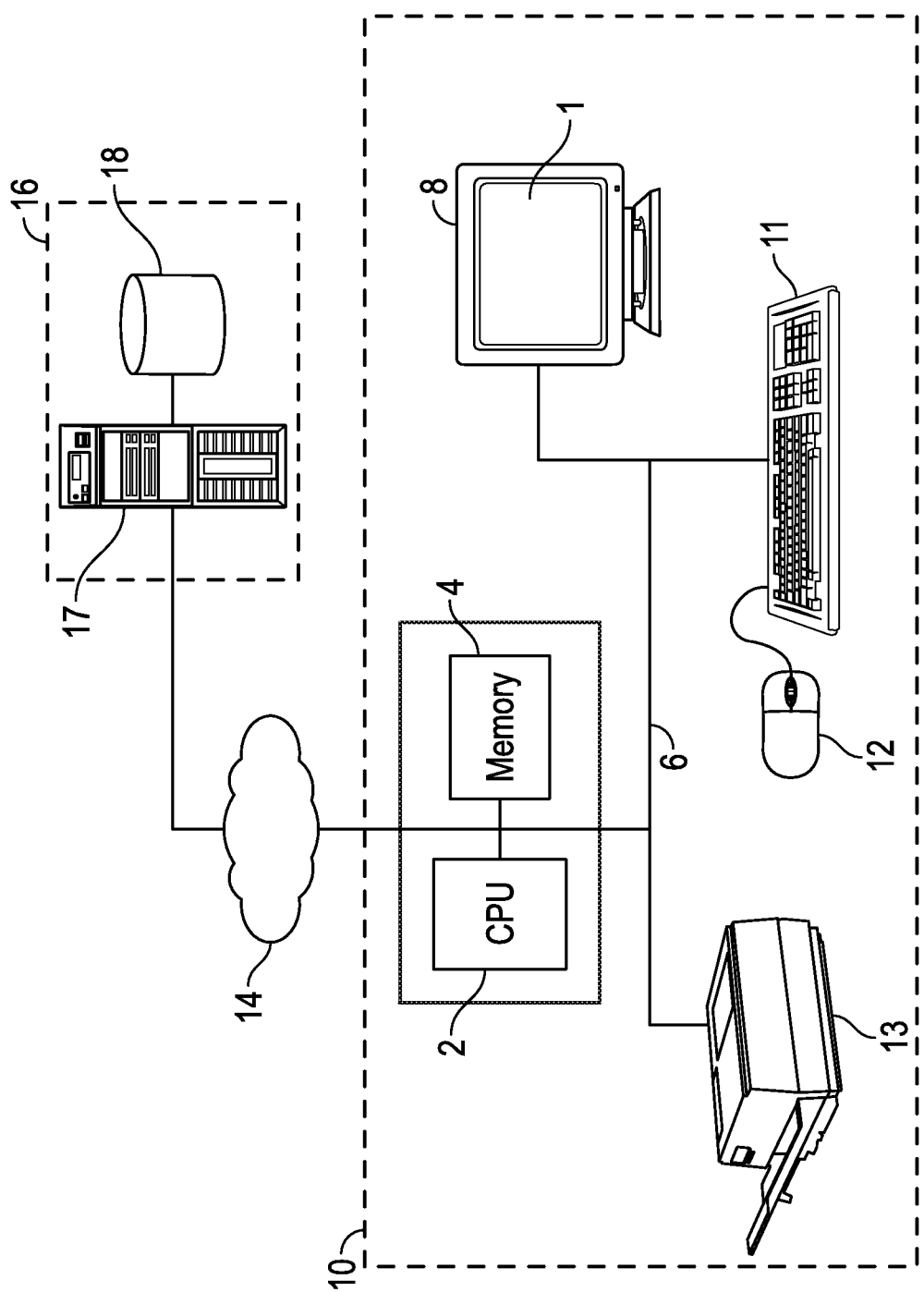
FIG. 1 shows a schematic representation of an example of computing system for implementing a system according to an embodiment of the invention.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the scope of the disclosure.

FIG. 1 illustrates a computing system that may be used to implement a system in accordance with an embodiment of the present invention. Referring to FIG. 1, a computing system 10 is shown, including a processor 2 and a non-transitory computer readable medium 4, linked by way of high speed bus 6. Input and output devices are shown in the form of monitor 8, keyboard 11, mouse 12 and printer 13. Computing system 10 in this example is connected via communications network 14, to a search system 16 comprising search engine 17 and electronic document database 18. The computing system 10 and/or the search system 16 may be loaded with software to enable implementation of a method and system for facilitating review of an electronic document. The electronic document in this embodiment is for example a patent document that can be retrieved from the document database 18, following a patent search in the search system 16. The electronic documents may be obtained from any other source, however.

The processor 2 may be implemented as a single processor or multiple processors working together or independently to execute processor executable instructions stored on the non-transitory computer readable medium 4 to implement the functionality described herein. Embodiments of the processor 2 may include a digital signal processor (DSP), a central processing unit (CPU), a microprocessor, a multicore processor, an application specific integrated circuit, and combinations thereof. The non-transitory computer readable medium 4 can be implemented as RAM, ROM, flash memory or the like, and may take the form of a magnetic device, optical device or the like. The non-transitory computer readable medium 4 can be a single non-transitory computer readable medium, or multiple non-transitory computer readable medium functioning logically together or independently. The search system 16 may also include a processor (not shown) and a non-transitory computer readable medium (not shown), linked by way of high speed bus (not shown). The processor and the non-transitory computer readable medium of the search system 16 may be implemented in a similar manner as the processor 2 and the non-transitory computer readable medium 4 discussed above.

Note that any computer hardware/software architecture may be utilised to implement an embodiment of the present invention. The invention is not limited to implementation by the type of computer architecture illustrated and described in relation to FIG. 1. For example, other arrangements such as central mainframe/terminal architecture, client/server architecture or any other type of arrangement may be utilised to implement the present invention. In one arrangement, a plurality of network computers may be utilised to enable, for example, a plurality of users to access the system from their own computer terminals. The network may be any network, the Internet for example.

It follows that a computing system 10 to implement a document review method according to an embodiment of the invention is well known to the skilled person in the art.

In a different arrangement a notebook computer, tablet computer, eBook reader device, a smart phone device or any similar device can be used.

According to this preferred embodiment the system comprises a user interface via which one or more users may review a plurality of electronic documents available for review via the user interface. In this example, the user interface may include appropriate software accessible and controllable by way of monitor 8, screen 1, keyboard 11 and mouse 12. The user interface may be accessible via a plurality of personal computers, for example, so that plurality of users can access the user interface. In one embodiment, the user interface may be provided via Internet access to a server computer arranged to serve pages forming part of the user interface.

In a further embodiment the user interface can be part of software package stored locally on a computer, similar to ADOBE® ACROBAT® 9 STANDARD Software package.

In the following, examples of a document review method according to a preferred embodiment of the invention will be described with regard to the review of patent documents. These patent documents can already be stored locally on a users computing system 10 or be accessible via a search system 16, such as the well known patent search systems provided by the European Patent Office (EPO) or Google, which allow a user to access content via their respective patent search services espacenet.com and google.com/patents. The EPO further provides the Open Patent Services (OPS) patent retrieval service, which can be used by a first data retrieval unit to retrieve a full patent document in its original PDF format and/or by a second data retrieval unit to retrieve only the description and claims of a patent in XML format, for example.

The patent search process itself is well known and can be performed by using, for example patent publication numbers and/or keywords. Patent document refers to any type of patent, such as design patent, (utility) patent and utility model. The term patent document or patent shall include issued/granted patents, patent applications as filed and/or published by a patent office. The term patent according to the preferred embodiments shall also include a draft of a patent application to be filed, which is still under preparation by a patent attorney and/or inventor.

Figure 2:
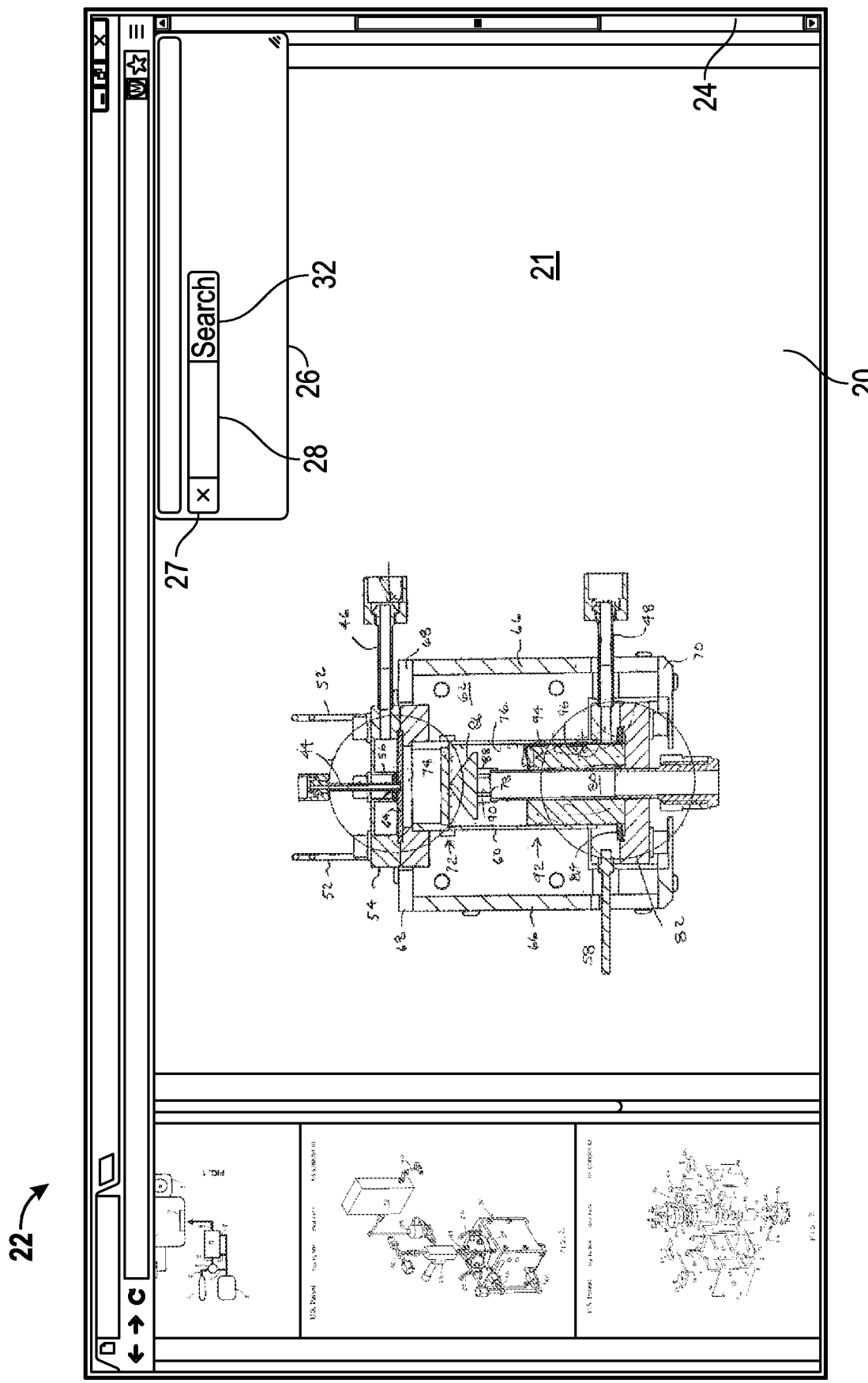
FIG. 2 is a screen shot of an interface for reviewing an electronic patent document in accordance with an embodiment of the invention showing a second display window arranged within the borders of a first display window.

FIG. 2 shows a patent document 20 (U.S. Pat. No. 6,789,789) obtained after conducting a patent search as indicated above. A first document section 21 of patent document 20 is displayed in a first display window 22 having a border 24 which forms the perimeter of the browser window, i.e. first display window 22. The first document section 21 comprises a main page showing a drawing of the patent document 20 under review and further includes thumbnail view of the remaining pages of the patent document 20 on the left hand side, which may not overlap the first display window 22 as shown in FIG. 2. The patent document 20 may be presented in its original PDF format within the first display window 22, which may be a browser window by using scalable vector graphics (SVG) as is well known to the skilled person (other known techniques can also be used and are readily apparent to the skilled person). Within the border 24 of the first display window 22 a second display window 26 is arranged overlapping the first document section 21. The second display window 26 is, relative to the first display window 22, small in size in order not to overlap too much of the first document section 21. The second display window 26 is shown as arranged within the border of the first display window 22 by having two sides of the border of the second display window 26 overlapping the border of the first display window 22 and the remaining portion of the second display window 26 overlapping the first display window 22. This is only one way of arranging the second display window 26 within the border of the first display window 22, since the second display window 26 is re-arrangeable, the second display window 26 can also be arranged within the first display window 22 without having any overlap between the borders of the first and second display windows 22 and 26.

The second display window 26 is preferably re-sizeable and also re-arrangeable according to user preferences. The second display window 26 may be configured as a floating window, so that even if the user conducts a scrolling operation in the first display window 22, the second display window 26 will remain visible at all times. The second display window 26 can be hidden, if the user clicks on the close button 27 thereof. In one embodiment, the second display window 26 can be moved to any desired location within the first display window 22, i.e. within the border 24. The second display window 26 can be re-sized by a grab-and-drag operation of the user as is indicated by the known bottom right hand corner symbol of the second display window 26 (the diagonal lines).

A search term input line 28 may be provided within the second display window 26 as part of a search functionality implemented by the search function module of the review system of this embodiment, which allows searching within the electronic document, such as the description, claims and abstract of the patent 20 displayed in the first display window 22.

The user reviewing the first document section 21 and trying to understand the teaching thereof can conduct a search by utilizing the search functionality provided in the second display window 26.

The first document section 21 shows a rather complex figure with various parts referenced by so called reference signs. The user trying to obtain an understanding of the various parts displayed in the first document section 21 utilizes the second display window 26 to conduct a search. For example, if the user wants to learn more about the part referenced by reference sign "88", the user will input "88" into the search input line 28 and initiate the search by clicking on search button 32.

Figure 3:
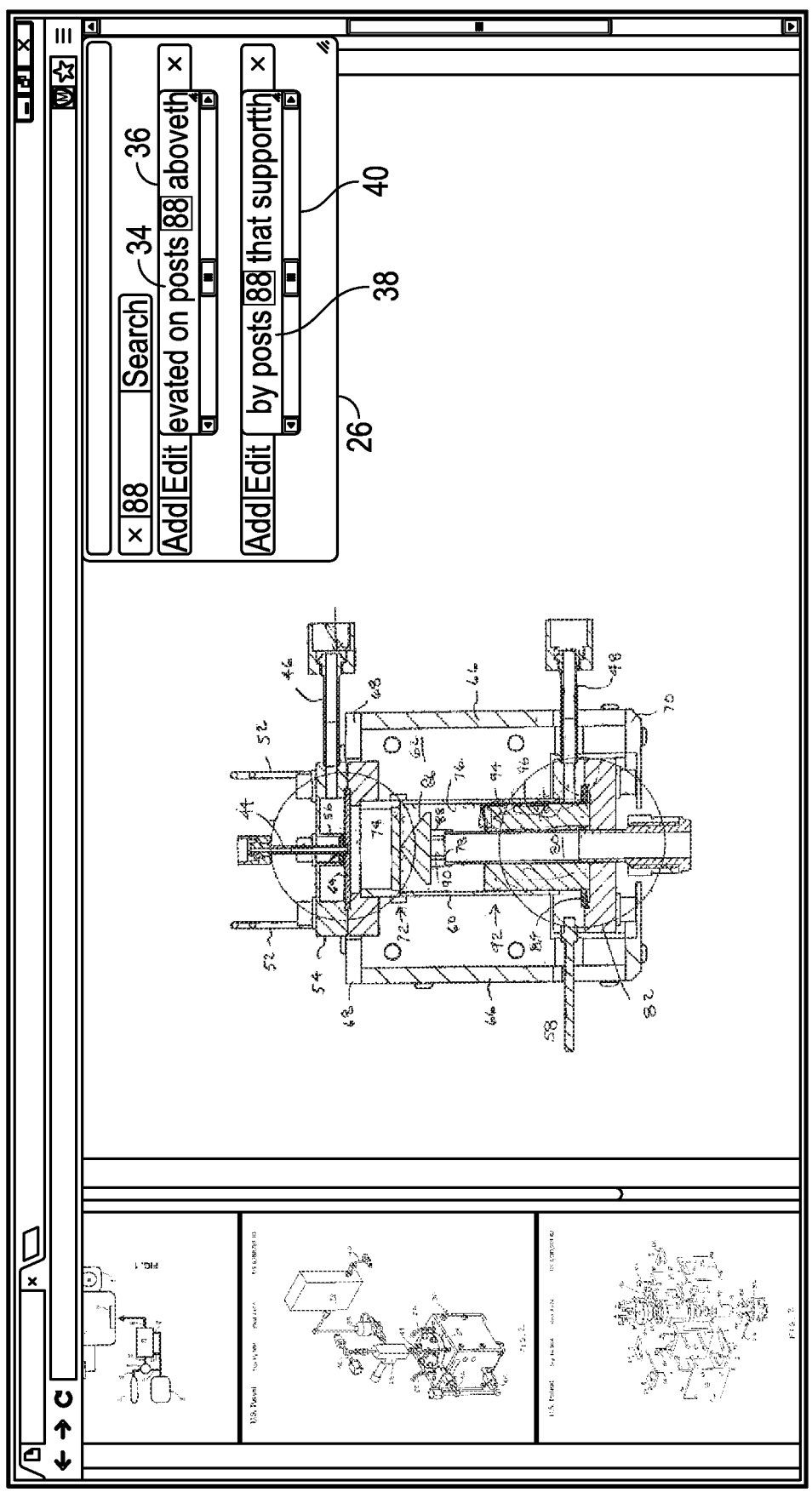
FIG. 3 is a screen shot of the interface according to FIG. 2 with search results displayed within the second display window in first and second result windows.

FIG. 3 shows the result of the search, which indicates that two hits were found. These hits are presented as a second document section 34 within a first result window 36 and a third document section 38 within a second result window 40. Each result window 36 and 40 is—similar to the second display window 26 as explained above—also re-sizeable by a grab-and-drag operation as indicated by the symbol in the bottom right hand corner of each result window 36, 40.

The first result window 36 shows only a first set of characters of the second document section 34 retrieved in response to said search. The first set of characters already indicate to the user that the search term "88" is referenced as "posts" in this patent document 20. This is confirmed by the second result window 40, which also only shows a first set of characters of the third document section 38 initially. If the user wants to review the remaining characters of the second document section 34, i.e. the remaining text portion included in the first result window 36 the user can re-size the first result window 36 accordingly (e.g by the grab-and-drag function). The grab-and-drag operation of resizing the first result window 36 has the advantage that the user can increase the window only as much as deemed necessary and thus show additional amount of characters to the extent necessary.

Figure 4:
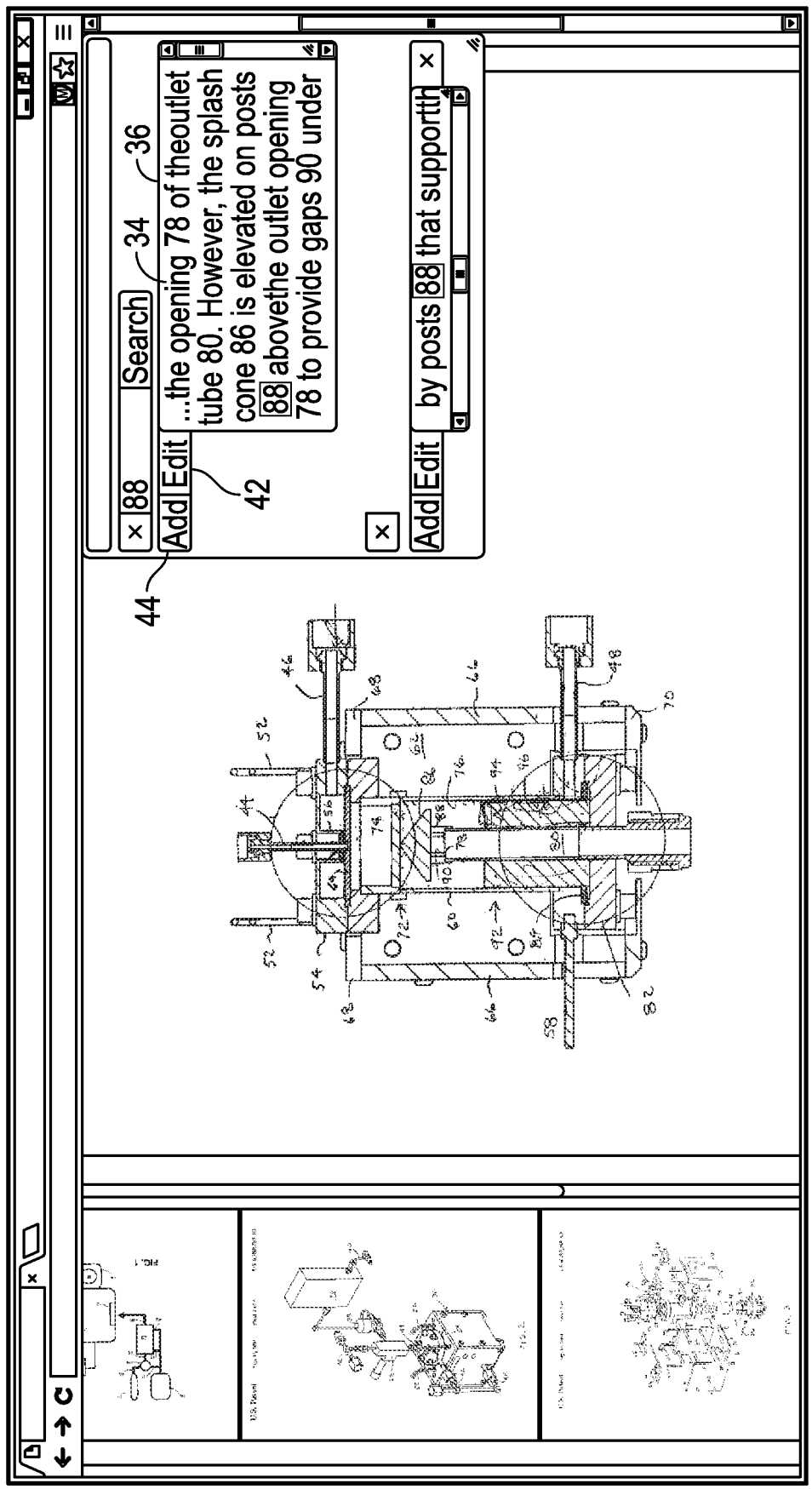
FIG. 4 is a screen shot of the interface according to FIG. 3 with a re-sized first result window within said second display window.

FIG. 4 shows that the size of the first result window 36 has been increased in response to user action. By doing so, more characters of the second document section 34 have been made visible to the user. It is now possible to obtain an even better understanding of the term in question. The user not only learns the meaning of the technical part associated with the search term "88" (i.e. "posts"), but also within what context it is disclosed and described in the patent document 20. As is evident from comparing FIGS. 2, 3 and 4, the search operation and user action in re-sizing the first result window 36 does not alter the first document section 21 displayed in the first display window 22. Put differently, the user can stay focused on the first document section 21 during the entire search operation and does not have to scroll away from the complex figure in order to obtain an understanding thereof. Even re-sizing of the first result window 36 does not affect the first document section 21. Instead the second result window 40 is displaced downwards within the second display window 26 in response to increasing the size of the first result window 36.

Should the user not have obtained a satisfactory understanding of the term "88" and need further text of the section within which the second document section was found, the user can obtain the text prior (or after) to the text passage currently being displayed in the first result window 36 by clicking on the dots " . . . " in the beginning (or at the end) of the first result window 36. This will retrieve a predefined set of characters of the text passage of the patent that is disclosed before (or after) the second document section. Thus, the document sections disclosed in each result window are excerpts taken from the patent abstract, description and/or claims of the patent under review. The user may also obtain detailed information about the exact page and/or line and/or paragraph number from which the text was retrieved by corresponding indication (not shown) within the second display window.

In one embodiment, each result window allows addition of the users own comments and remarks by selecting editing function through clicking the edit button 42. Such user added comments within the result window can be provided in a font style and/or size different from the font style and/or size of the retrieved document sections.

The user can also add the content of the result window as an annotation to the original document displayed in the first display window 22 due to the provision of an annotation unit of the review system. By clicking the button 44 the content of the first result window 36 is added to the first display window 22 as an annotation 45 (see FIG. 5). The annotation 45 can be added by merging the content of the first-result window 36 to the document displayed in the first display window 22 using any suitable technique or programming language. For example, when the patent document 20 is in a .pdf format, the content of the first-result window 36 can be provided as a "second layer" by using XML javascript. The "second layer" is then merged with the patent document 20 when the user downloads the edited document to their computing system 10 for printing the patent document 20. Thus, the annotation 45 can consist of the second document section 34 and/or the user's comments.

Figure 5:
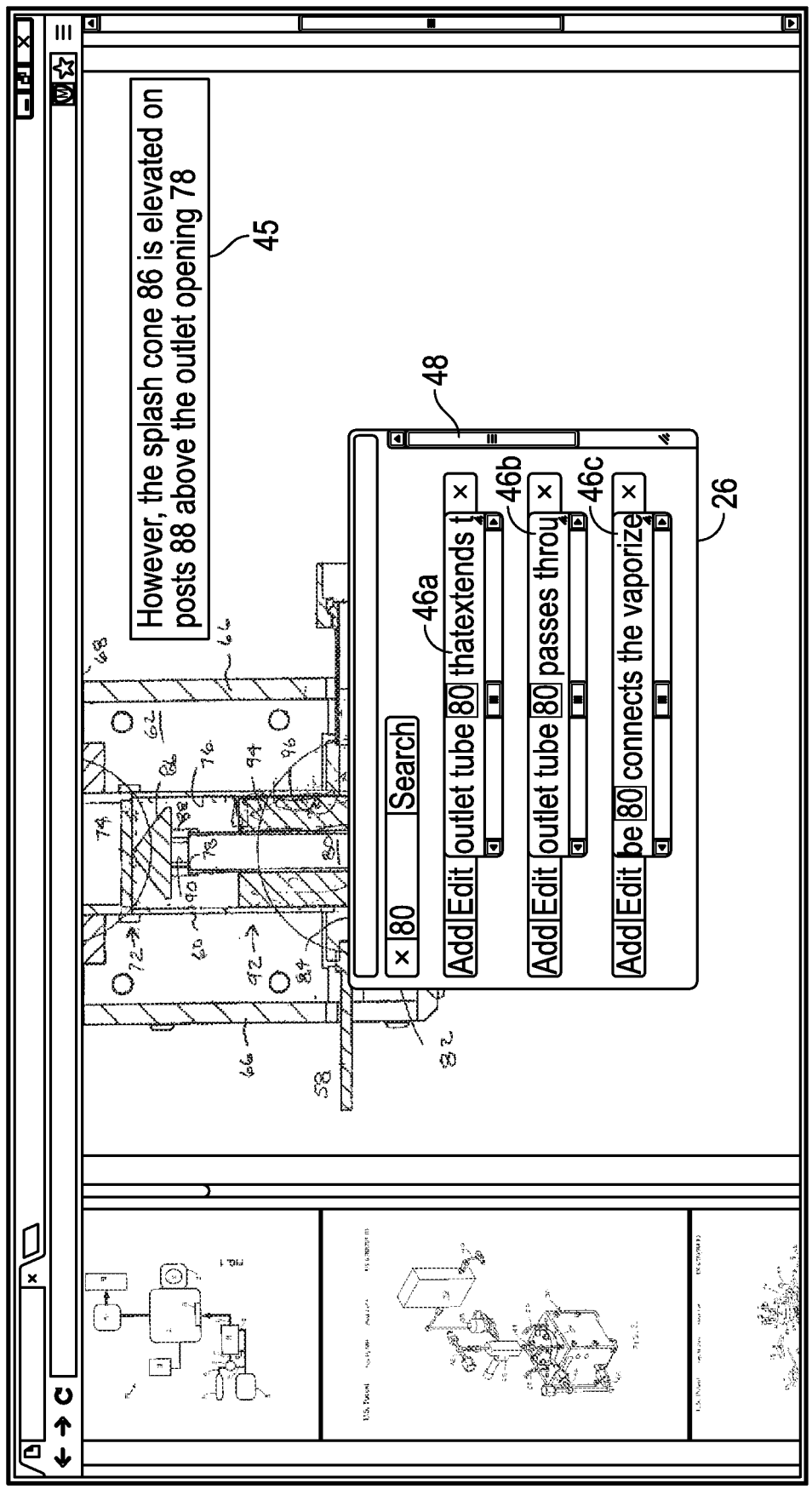
FIG. 5 is a screen shot of the interface according to FIG. 4 with the second display re-arranged and an annotation added to the first display window.

FIG. 5 shows the annotation 45 created as explained with respect to FIG. 4 above. FIG. 5 further shows that the user in his further review has re-arranged the second display window 26 in order to have it closely aligned with a particular section of interest. After having the term "88" reviewed and understood, the user now focuses on the term "80" and has placed the second display window 26 adjacent to this reference sign. Upon searching for this search term the results again, are displayed in the second display window 26.

In response to the search several results were found, each of which is displayed in a separate result window 46 *a, b, c* within said second display window 26. It is evident from the second display window 26 that several results were obtained in response to the search, because the second display window 26 now has a scroll bar 48. Thus all result windows are not displayed in FIG. 5. In order to save screen space, not all result windows are displayed at once. The user can choose to have them all displayed by increasing the size of the second display window 26 accordingly, or the user can use the scroll bar 48 to review the remaining result windows. As explained with regard to FIG. 4, the user can see more of each document section displayed within each result window 46*a, b, c* in order to obtain a clear understanding of the term "80" and the context within which it is disclosed in the patent, if user chooses to increase the size of said result window.

It is evident that each result window is independent from the other result window, so that the user can choose to close a specific result window in case the result displayed therein is not considered useful by the user anymore.

It is obvious that the user can search for words and/or phrases within the patent 20 and is not limited to searching for reference numbers only. Thus, the user while reviewing the figure of the patent 20 could search for a particular phrase, word or the like to learn more about the teaching of the patent 20. For example the user could search for "claim" in order to have the claims show up in the second display window and review the patent claims while reviewing the figures in the first display window.

The search function module is for example linked with XML (or HTML or similar format) version of the patent document 20 in order to increase the download speed and thus improve overall usability. Thus, rather than searching within a PDF version and getting excerpts from the PDF to be presented within each result window, the second display window is linked with XML (or HTML or similar format) version of the patent text. The first display window 22 can thus display the patent in a first data format, in this case PDF version of the patent 20, while the second display window 26 uses a different data format (XML and/or HTML or similar) in order to conduct the search and retrieve the search result.

From the above it follows that the user of this preferred embodiment does not have to leave the page currently displayed in the first display window. This provides a significant advantage in maintaining the users' concentration level throughout the entire patent document review process. Contrary to prior art methods mentioned earlier, no jumping or browsing away to other sections of the patent is necessary in order to obtain a deep understanding of the document section under review.

The ability to re-arrange the second display window 26 relative to the first display window 22 provides the advantage that the user can align the second display window 26 closely to the content of interest within the first window. This aids in maintaining the users concentration level, because the user can stay focused on said content of interest while obtaining further information about said content of interest by retrieving the text portion within the second display window 26. Not only does the user not have to jump to a different document section, it is even possible to keep the users eye movement at a minimum during the review of the content of interest. This is important during the review of complex documents, in particular during the review of complex patent figures.

Figure 6:
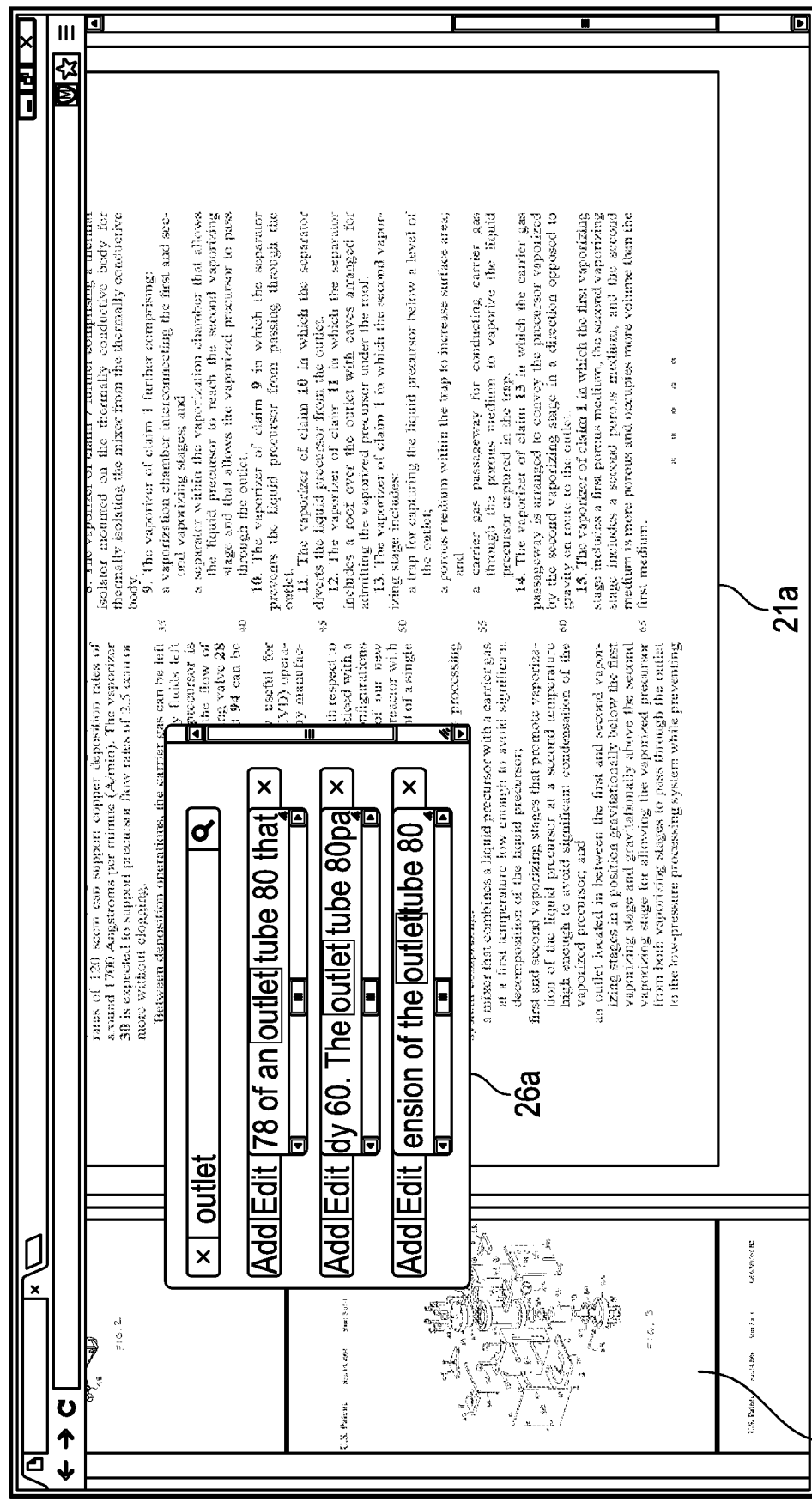
FIG. 6 is a screen shot of a further preferred embodiment of a method and system of the invention.

FIG. 6 shows a further preferred embodiment of the method and system according to the invention. The figure shows a first display window 22a displaying a first document section 21a and a further document section 50. The further document section 50 may be controllable independently from the first document section 21a, so that different sections of the patent under review can be displayed in the further document section 50. The further document section 50 provides a visible view of a selected section of the patent document 20. The first display window 22a displaying the first document section 21 and the further document section 50 can be accomplished by passing signals to the monitor 8. In one embodiment, a suitable programming language, such as HTML code is passed to the processor 2, which then generates and passes video signals to the monitor 8.

In this example, the user has aligned the second display window 26a closely to a section of interest in the first document section 21a. In claim 1 of the patent 20 under review, the user wants to obtain a better understanding of the term "outlet" as defined therein (in the last paragraph of claim 1 of the patent under review). The user inserts the term "outlet" in the search line of the second display window 26a and conducts the search.

The search results are presented in results windows within the second display window 26a in a similar manner as described with regard to the previous embodiment. After retrieving the results the user now learned that the reference sign corresponding to the search term "outlet" is "80", as is evident from the result windows as shown in FIG. 6.

Without the need to alter the content of the first document section 21a, the user can control the further document section 50 and retrieve the figure showing the reference sign "80". As is clear from FIG. 6, the user can during this review process maintain his view on the claim, the further explanations provided in the second display window 26a and the relating figure of the patent under review. This enables the user to review the patent efficiently. In particular, each of the section 50, second display window 26a and first section 21a is separately controllable.

Once the review according to any of the above described embodiments is completed, the user may have an annotated document as an end result (in case the user used the annotation function as described). The user may choose to either save an electronic copy of the annotated document, or if desired, print out the annotated copy. It is also possible for the user to share his reviewed version with another user via the system. This allows collaboration within teams and further increases productivity. Of course, the system also allows the user to continue his review later and thus allows for saving the annotated document for later review. Moreover, annotations tools provided in the first display window (not shown) may be used to annotate the first document section.

It is evident that the described method and system enables the user to stay focused on the document section currently under his review in the first display window, i.e. the user does not have to "leave" the document section in the first display window 22, 22a in order for him/her to obtain a better understanding thereof. The second display window 26 not only allows input of search terms, but more importantly it presents the result of the search within this second window 26. The search results are provided in separate result windows, which can be re-sized to show even more of the text passage within which the search term was found. It is possible to provide further display windows similar to the second display window according to another preferred embodiment of the invention.

Figure 7A:
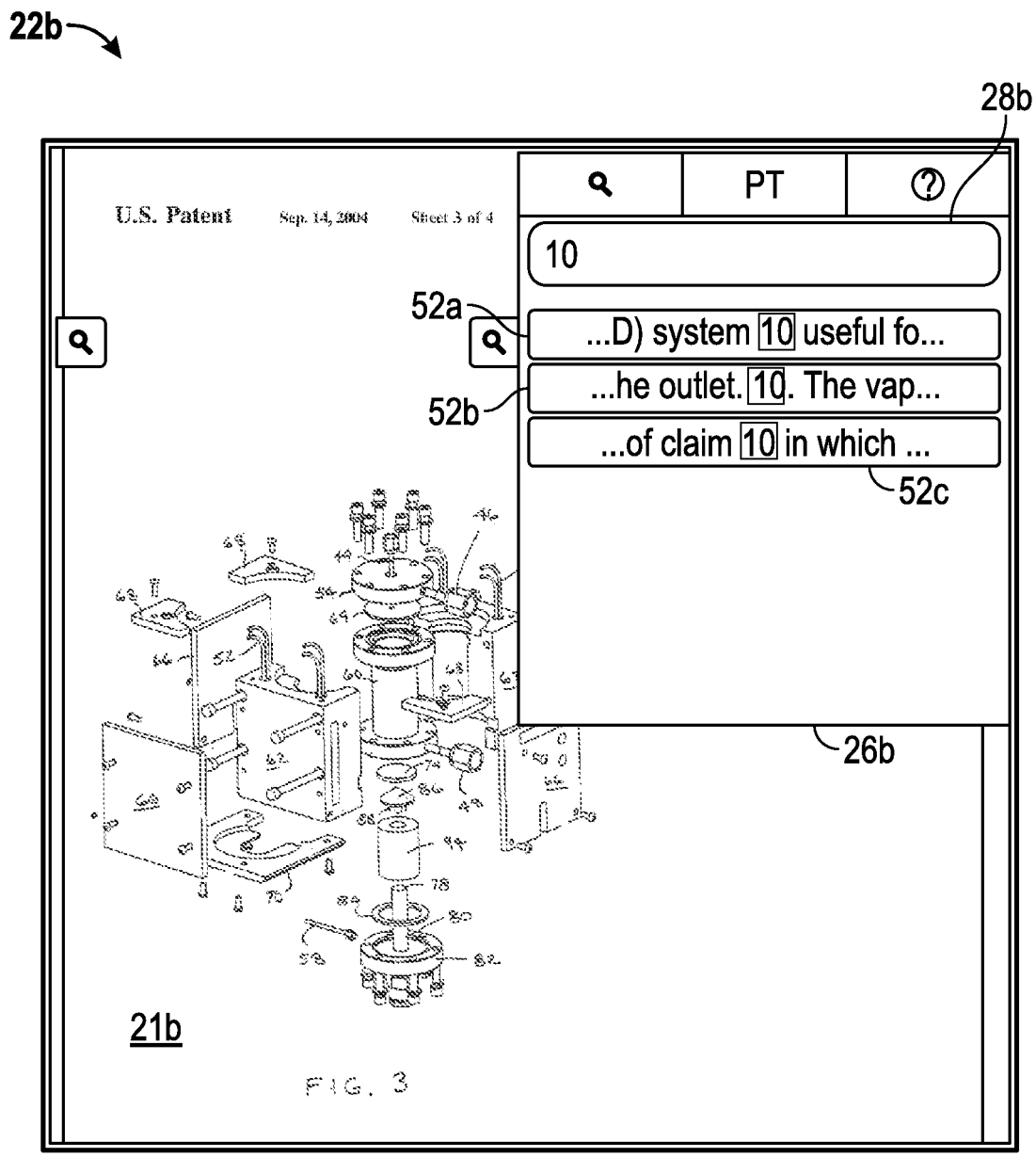
FIGS. 7a and 7b show an alternative method of displaying the result window.
Figure 7B:
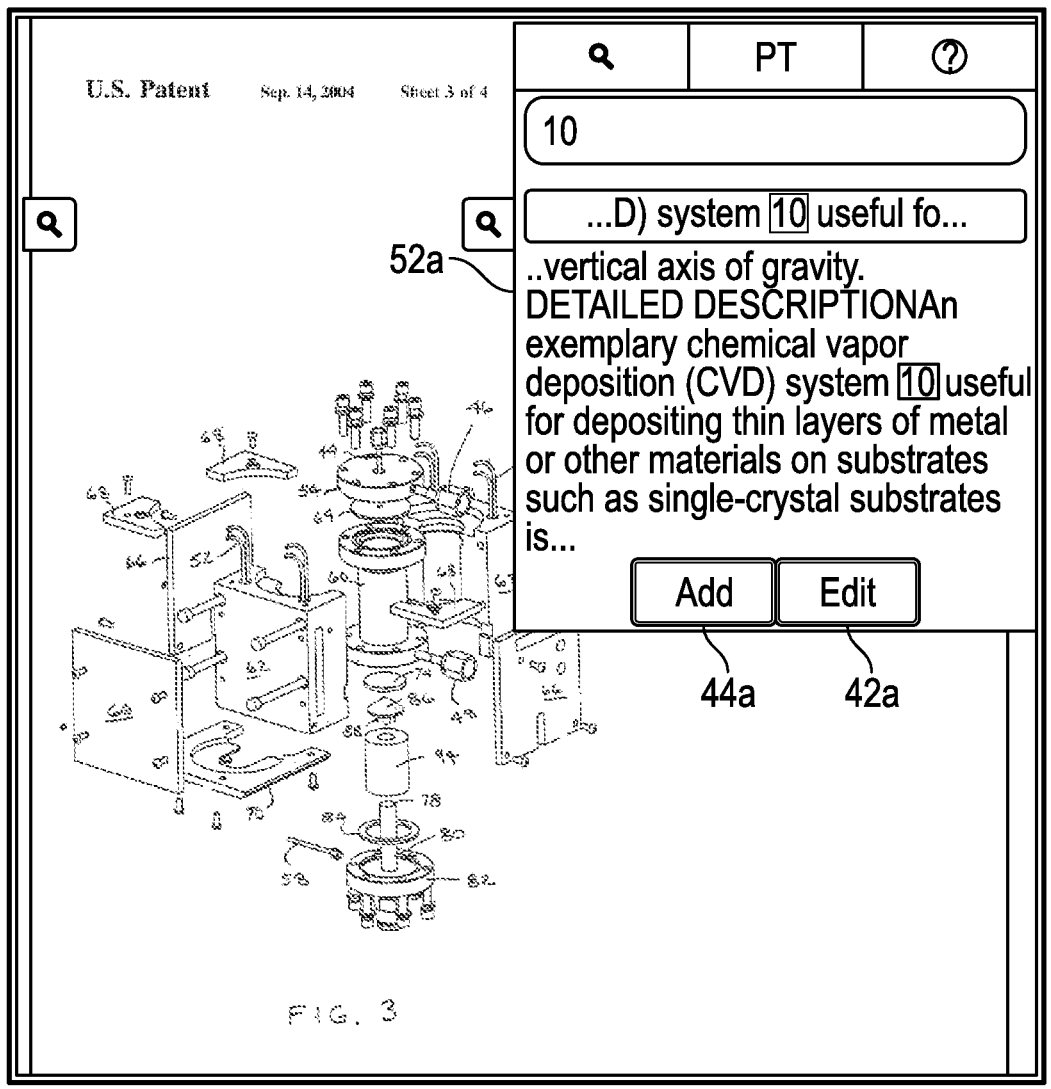

FIGS. 7a and 7b show a further embodiment of the electronic document review system and method. Similar to the previous embodiment, a first display window 22b and a second display window 26b are shown in FIG. 7a, whereas the first display window 22b displays a first document section 21b (with the thumbnails windows hidden). The search term input line 28b indicates that a search in view of the search term "10" has been conducted. The search results are displayed in the search list, which comprises three result windows 52a to 52c. In this embodiment the annotation function and edit function are first displayed upon expanding the size of the result window 52a, 52b or 52c, which is best seen in FIG. 7b.

FIG. 7b shows the result window 52a with increased size and arrangement of the annotation function 44b and edit function 42a at the bottom of the result window 52a. FIGS. 7a, 7b also give an example of using an embodiment of the method and system for reviewing an electronic document on a tablet computer device, such as an iPad®. The second display window 26b can be closed by clicking/touching on the tab with the magnifying glass arranged on the left hand side of the second display window 26b as shown in FIGS. 7a and 7b. It is clear from FIGS. 7a, 7b that a further tab with a magnifying glass icon is arranged at the left side of the first display window 22b. If the user clicks/touches this second tab with the magnifying glass icon the second display window is opened by being arranged on the left hand side of the first display window 22b, while at the same time the currently shown (right hand side) second display window 26b is automatically closed.

Figure 8:
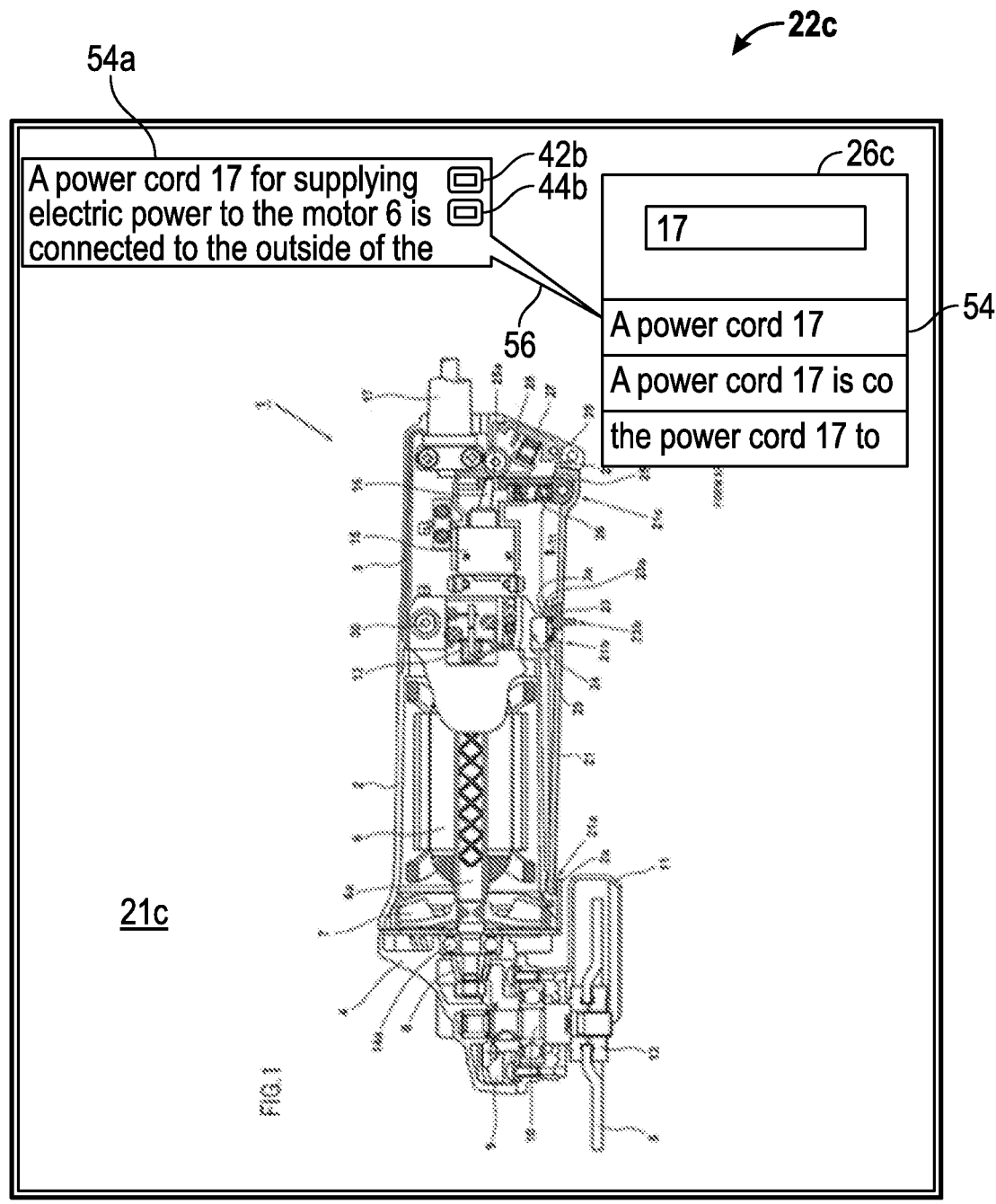
FIG. 8 shows a further embodiment of displaying a re-sized result window.

FIG. 8 shows a further embodiment of the document review method and system, in which the second display window 26c has a result list comprising three result windows. The result windows where obtained in view of a search with the search term "17". The result window 54 shows a first set of characters of the second document section obtained in view of the search. In order to show (an increased amount of characters of) the total amount of characters the user can select result window 54 and in reaction to such selection an expanded result window 54a is created. The enlarged result window 54a is pointing to the result window 54 and thereby maintains a link 56 to the second display window 26c. The enlarged result window 54a is by default arranged close to the upper border of the first display window 22c, so as to ensure that the view of the first document section 21c is not influenced. Thus it is not by default arranged at the same horizontal level as its corresponding result window 54. The same holds true for every other result window 54 and its corresponding enlarged result window (not shown). Despite this the user has still the option to re-arrange the enlarged result window 54a relative to the first display window 22c, since it is also configured as a re-arrangeable enlarged result window 54a. In particular, the enlarged result window 54a is also re-arrangeable relative to the second display window 26c.

The link 56 between the enlarged result window 54a and the result window 54 can be configured such that it is only visible if the user scrolls over the enlarged result window 54a or the result window 54. Thus, this ensures that the first display section's 21c visibility is kept at a maximum level. Depending on the arrangement of the second display window 26c the enlarged result window 54a to be created could also be arranged close to the bottom, left or right hand side border of the first display window 22c. In other words, the method and system preferably arranges the enlarged result window(s), e.g., enlarged result window 54a close to the frame/border line of the first display window 22c as the system is optimized to utilize as much white space of the first display window 22c as possible. Generally, the portion next to the border has an empty margin or at least discloses non-critical content (e.g. a page, line number, column number or similar). Thus the system utilizes this in order to avoid any overlap between any critical written/shown content of the first document section 21c and a possible enlarged result window, when initially creating the re-arrangeable enlarged result window. Any additional enlarged result window that is created will utilize the remaining white space.

Figure 9A:
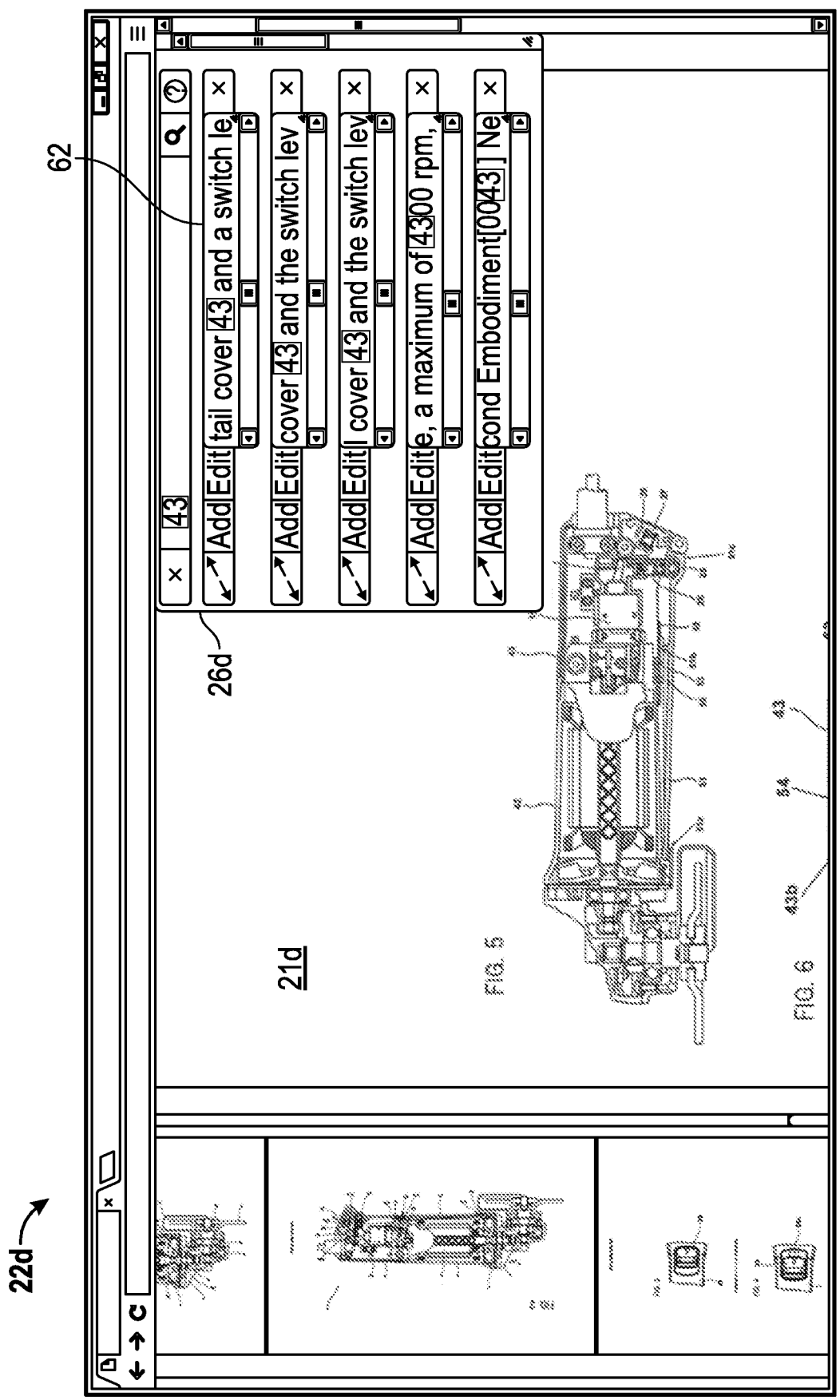
FIG. 9a to 9d show an interface of a further preferred embodiment of the document review system and method.

FIG. 9a shows a further embodiment, which is similar to the previous embodiments in that it also displays a first display window 22d and second display window 26d. The second display window 26d has a result list with several result windows that each discloses a document section, whereas the first result window is identified by numeral 62.

Figure 9B:
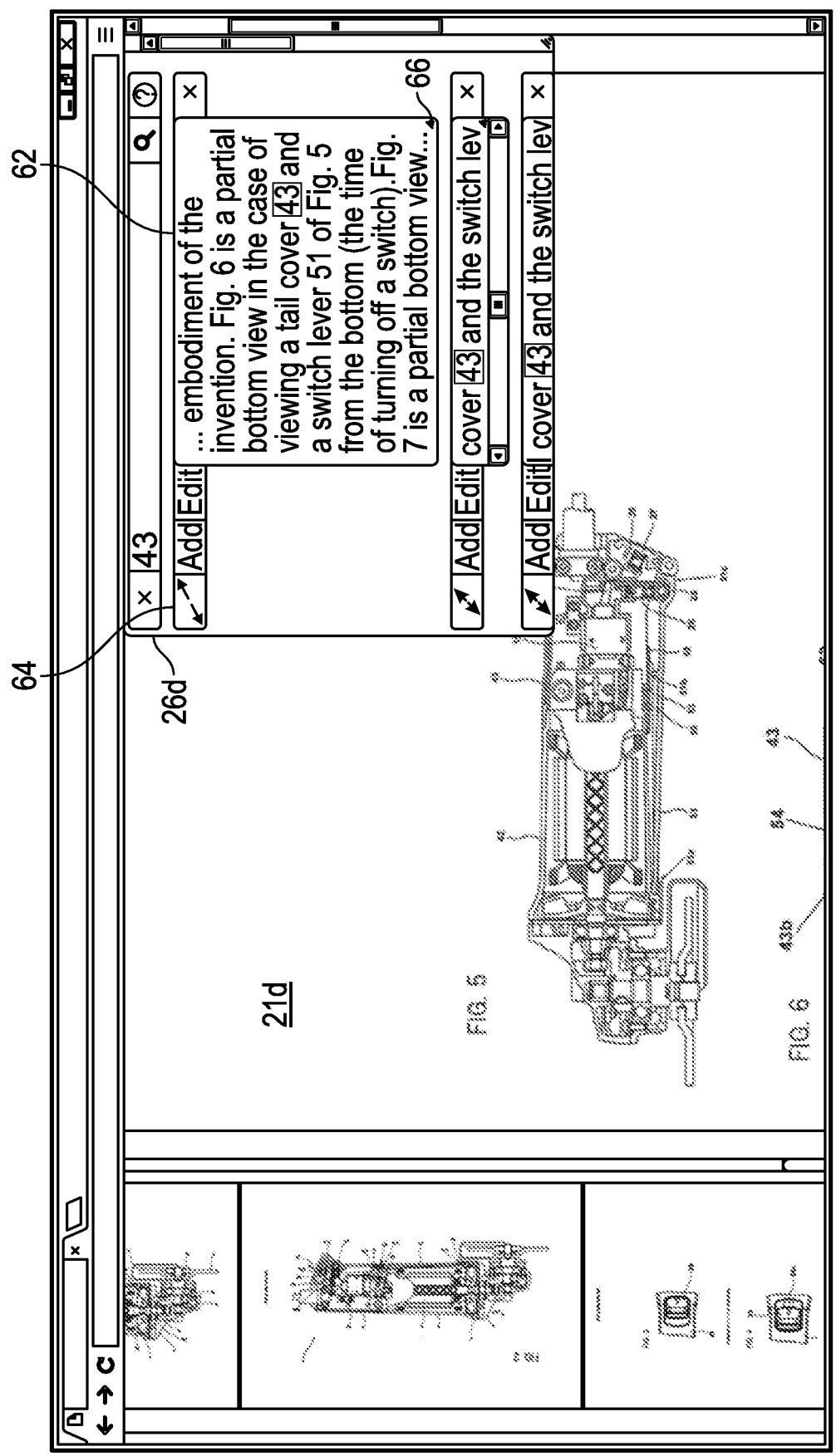

FIG. 9b shows that the size of the first result window 62 has been increased. Increasing the first result window 62 can be conducted by either clicking the button 64 or grabbing the corner 66 and dragging said corner 66 such that the first result window 62 is increased. In case the user desires to continue reading in the full text where the second document section displayed within the first result window 62 ends, the user may click on a specifically foreseen button (not shown) next to the first result window 62. By clicking such button the document section corresponding to the second document section of the first result window 62 of the full text of the patent under review is loaded within the second display window 26d according to this embodiment.

Figure 9C:
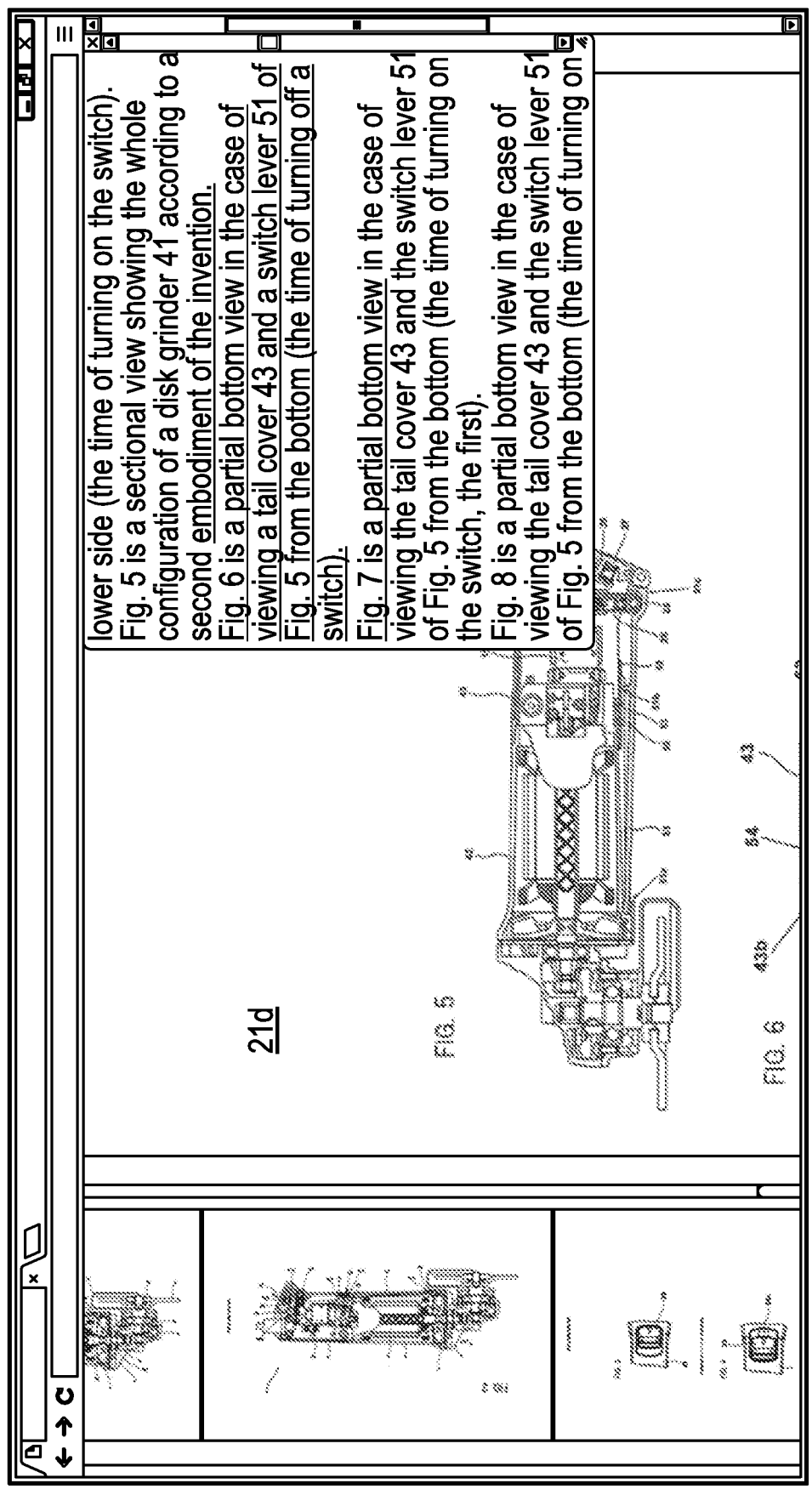

FIG. 9c shows the full text of the document under review with the portion of the text corresponding to the text portion of the first result window 62 as underlined. The user may now scroll up and/or down and read more of the text. In order to clearly indicated to the user, which section corresponded to the first result window 62 result, such section is shown as being highlighted (in this embodiment underlined). The user can now continue reading in the entire text until he has obtained a sufficient understanding of the feature of interest. As is evident from FIGS. 9a to 9c, all of the described user operations do not affect the first document section 21d (neither the main figure nor the thumbnail windows thereof). No "jumping away" from the first document section 21d, as would have been the case in the prior art, is conducted upon interacting with the results in the second display window 26d. The user can close the full text review and return to the display of the result windows at any time by clicking a respective close button (shown as an x in the top right hand corner of the second display window).

Figure 9D:
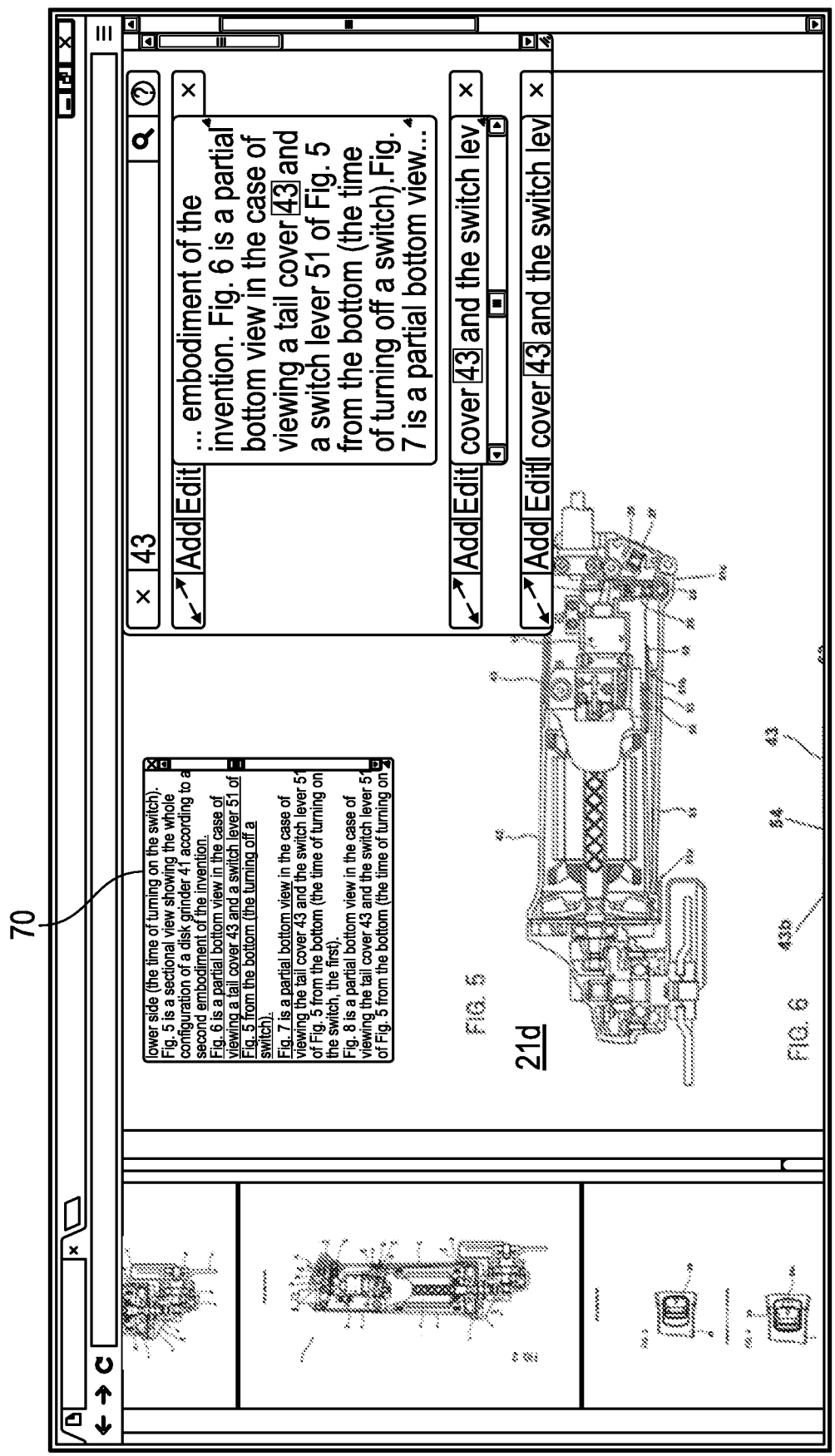

FIG. 9d shows that alternatively the full text section can be provided in a third display window 70 if desired. Also this window 70 is a floating, re-sizeable and re-arrangeable giving the user maximum flexibility when studying the first document section 21d in the first display window 22d. Thus, even if the user scrolls within the first display window 22d, the third display window 70 remains in front and visible at all times.

It follows that the preferred methods and systems according to the invention enable a more cost efficient and productive review of complex documents, such as patent documents. The user can electronically review an electronic document and reduce print outs of the document under review. Long and/or complex documents are reviewed easily and a high concentration level of a user is maintained at all time. A significant amount of time in reviewing such complex documents can be saved, which also has a positive effect on the energy consumption of the computing system used.

Tests conducted by patent professionals have also shown that significant amount of time can be saved by using the method and system according to the preferred embodiments of the invention. Compared to reviewing a patent document with known systems (such as espacenet) productivity of the patent professional was increased significantly.

Although the preferred embodiments of the present invention have been disclosed for illustrative purposes, those skilled in the art will appreciate that various modifications, additions and substitutions are possible, without departing from the scope of the invention as disclosed in the accompanying claims.

What is claimed is:

1. An electronic document review method for reviewing an electronic document by at least one user, said method comprising the steps of:

Displaying at least a first document section of said electronic document in a first display window;

Displaying at least a second document section of said electronic document in a second display window;

Arranging said second display window so that said second display window is arranged within the border of the first display window and such that, while open, said second display window stays in front of the first display window and the first document section is visible in the first display window; and Providing a search functionality having a search input line within said second display window;

Creating at least two result windows within said second display window in response to said search, a first one of the result windows including a second document section displayed within the first one of the result windows, and a second one of the result windows including a third document section displayed within the second one of the result windows, said second document section including at least a part of a first sentence of said electronic document that is not a part of the first document section of said electronic document, said third document section including at least a part of a second sentence of said electronic document that is not a part of the first document section of said electronic document, wherein the second display window is configured as a floating window to remain visible during a scrolling operation of the first document section in the first display window.

2. The method according to claim 1, further comprising:
Increasing the size of at least one of the result windows by a user and, upon increasing the size, an increased number of characters of the total amount of characters of the second document section are displayed.

3. The method according to claim 1, further comprising:
Displaying a first set of characters of the total amount of characters of said second document sections in said result windows in response to said search, wherein upon increasing the size of at least one of said result windows by a user further characters of said total amount of characters of the second document section are displayed within said result window.

4. The method according to claim 1, further comprising:
Creating said second display window as a rearrangable floating window.

5. The method according to claim 1, further comprising
Retrieving said first document section for display in the first display window in a first data format; and
Retrieving said second document section for display in said second display window in a second data format different from the first data format.

6. An electronic document computer review computing system for reviewing an electronic document by at least one user, said computing system comprising:
   a processor;
   an input device connected to said processor for communicating user inputs to the processor;
   a monitor connected to said processor for displaying the electronic document; and
   a non-transitory computer readable medium linked to the processor and storing processor executable instructions that cause the processor to:
   (a) display on the monitor at least a first display window displaying at least a first document section of said electronic document, said first display window having a border;
   (b) display on the monitor at least a second display window displaying at least a second document section of said electronic document;
   (c) arranging said second display window so that said second display window is located within the border of the first display window and such that, while open, said second display window stays in front of the first display window and the first document section is visible in the first display window;
   (d) display a search term input line configured to receive a search term from the input device, the search term input line within said second display window, and conduct a search of the electronic document with the search term, wherein the processor causes the monitor to display a plurality of result windows arranged within said second display window in response to said search, wherein at least a second document section is displayed in a first one of the result windows, and at least a third document section is displayed in a second one of the result windows of said second display window in response to a search conducted utilizing the search term input line and includes at least a part of a sentence of said electronic document that is not a part of the first document section of said electronic document; and
   wherein the second display window is configured as a floating window to remain visible during a scrolling operation of the first document section in the first display window is configured to remain unaltered during interaction by a user with the display of the search in said second document section.

7. The system according to claim 6, wherein the result windows are re-sizeable and shows an increased number of characters of the total amount of characters of the second document section upon increasing its size.

8. The system according to claim 6 wherein said second display window is a rearrangeable floating window.

9. The system according to claim 6, wherein the processor executable instructions include a first data retrieval unit and a second data retrieval unit, that when executed by the processor, cause the processor to:
   the first data retrieval unit retrieves said at least a first document section in a first data format for display in said first display window, and
   the second data retrieval unit retrieves said at least a second document section in a second data format different from the first data format.

10. A non-transitory computer readable-medium comprising processor executable instructions that when executed by a processor cause a processor to:
   Display at least a first document section of said electronic document in a first display window;
   Display at least a second document section of said electronic document in a second display window; and
   Arrange said second display window so that said second display window is arranged within the border of the first display window and such that, while open, said second display window stays in front of the first display window;
   Provide a search functionality having a search input line within said second display window; and
   Display in said second display window, at least two result windows within said second display window in response to said search, a first one of the result windows including a second document section displayed within the first one of said result windows, a second one of the result windows including a third document section displayed within the second one of said result windows said second document section including at least a part of a first sentence of said electronic document that is not a part of the first document section of said electronic document, said third document section including at least a part of a second sentence of said electronic document that is not a part of the first document section of said electronic document;
   wherein the second display window is configured as a floating window to remain visible during a scrolling operation of the first document section in the first display window.

11. The non-transitory computer readable medium of claim 10, further comprising processor executable instructions that when executed by a processor cause the processor to:
   Increase the size of the result windows and, upon increasing the size, an increased number of characters of the total amount of characters of the second document section are displayed.

12. The non-transitory computer readable medium of claim 10, further comprising processor executable instructions that when executed by a processor cause the processor to:
   Retrieve said first document section for display in the first display window in a first data format; and
   Retrieve said second document section for display in said second display window in a second data format different from the first data format.

* * * * *

UNITED STATES PATENT AND TRADEMARK OFFICE
CERTIFICATE OF CORRECTION

PATENT NO. : 10,846,467 B2  
APPLICATION NO. : 16/564656  
DATED : November 24, 2020  
INVENTOR(S) : Tony Afram Page 1 of 1

It is certified that error appears in the above-identified patent and that said Letters Patent is hereby corrected as shown below:

In the Specification  
Column 1, Line 56: After "WORD" Delete "," and replace with -- ® --

In the Claims  
Column 16, Line 9-11: After "display window" delete "is configured to remain unaltered during interaction by a user with the display of the search in said second document section"

Signed and Sealed this  
Second Day of February, 2021

Drew Hirshfeld  
*Performing the Functions and Duties of the  
Under Secretary of Commerce for Intellectual Property and  
Director of the United States Patent and Trademark Office*